A. LEVEDAHL.
CLAMPING DEVICE.
APPLICATION FILED MAY 11, 1914.
1,189,268.
Patented July 4, 1916.
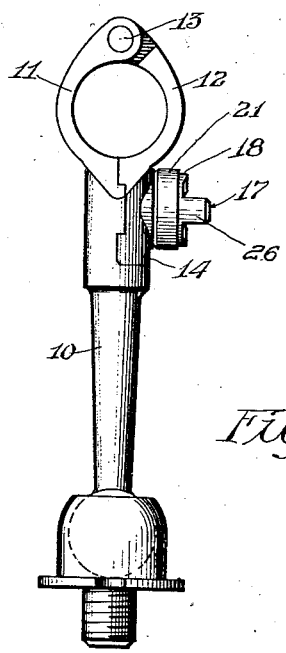
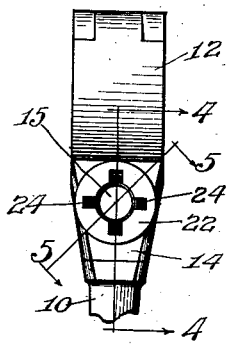
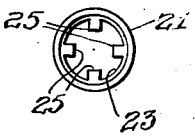
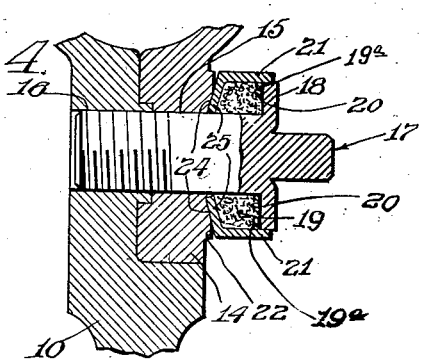
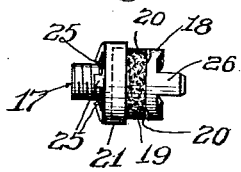
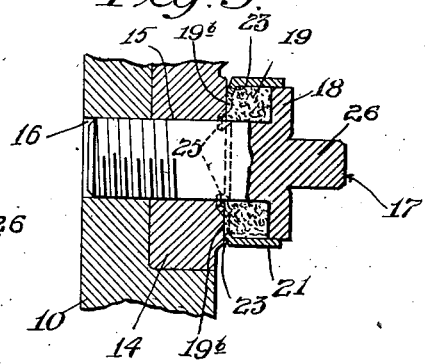
Witnesses:
Harry S. Gaither
Eugene O'Wann
Inventor
Axel Levedahl
by Poole & Cromer
Attys.

UNITED STATES PATENT OFFICE.

AXEL LEVEDAHL, OF AURORA, ILLINOIS, ASSIGNOR TO AURORA AUTOMATIC MACHINERY COMPANY, OF AURORA, ILLINOIS, A CORPORATION OF DELAWARE.

CLAMPING DEVICE.

1,189,268.   Specification of Letters Patent.   Patented July 4, 1916.

Application filed May 11, 1914. Serial No. 837,656.

*To all whom it may concern:*

Be it known that I, AXEL LEVEDAHL, a citizen of the United States, and a resident of Aurora, in the county of Kane and State of Illinois, have invented certain new and useful Improvements in Clamping Devices; and I do hereby declare that the following is a full, clear, and exact description thereof, reference being had to the accompanying drawings, and to the letters of reference marked thereon, which form a part of this specification.

This invention relates to a clamping device of that type comprising a rotatable member, a non-rotatable member having screw-threaded connection therewith, and a yielding or compressible washer interposed between said members and acting to prevent turning or loosening of said members relatively to each other when the same are subjected to jars or vibrations.

The clamping device, forming the subject-matter of the present invention, is particularly designed for clamping together the ends of a split-bearing of a connecting rod or the like.

The invention includes means, in connection with such yielding washer and the parts associated therewith, adapted to increase the resistance to the turning of the rotatable member or the like.

The invention also includes a compressible washer so constructed that the friction between the contacting surfaces of the rotatable member and the washer will not be lessened or decreased by the presence or entrance of lubricant between such parts, together with means for preventing rotation of the washer during the compression of the same between the rotatable and non-rotatable members.

The invention also includes means for laterally confining or inclosing the washer so as to prevent the same from spreading when said washer is placed under compression, and also for retaining said washer under compression under the pressure applied thereto upon the rotation of the members relative to each other.

The invention further consists in the matters hereinafter described and more particularly pointed out in the appended claims.

In the accompanying drawings—Figure 1 is a side view in side elevation of a connecting rod having applied thereto a clamping device constructed in accordance with my invention; Fig. 2 is a front fragmentary elevation of the said rod with the clamping device removed; Fig. 3 is a top plan view of the ring or annular member forming a part of my clamping and locking device; Figs. 4 and 5 are enlarged sectional views taken on lines 4—4 and 5—5, respectively, of Fig. 2, with my clamping device applied to the parts shown in said Fig. 2; Fig. 6 is a side view in side elevation of the parts of my clamping device assembled; and Fig. 7 is a perspective view of the several parts of my clamping device separate from each other.

In the accompanying drawings is illustrated a connecting rod 10, of that type having at one end thereof a split-bearing, consisting of two oppositely facing, semi-circular bearing members 11, 12, hinged together at their outer ends by the pivot pin 13, and adapted to encircle and to be clamped about a crank-shaft, pin or the like (not shown), with which the connecting rod is to be engaged. As shown, the member 11 is integral with the rod and constitutes the fixed bearing member thereof. The member 12 forms the swinging bearing member of the rod, and its free end portion 14 is adapted to contact with and to be clamped to the end portion of the rod, with which the fixed bearing member 11 is made integral.

My clamping device, a preferred form of which is illustrated in the drawings, is shown as applied for the purpose of clamping the bearing member 12 to the rod 10. The said member 12 is provided with a bolt hole 15, and the rod 10 with a registering bolt hole 16, the latter being provided with internal screw threads. A screw bolt 17 is inserted through the hole 15, and is provided at one end with screw threads adapted to engage the screw-threaded hole 16. Said bolt 17 is provided with a head 18 adapted to bear against the member 12, and said bolt-head, as shown in the drawings, has the form of an annular flange made integral with and of a greater diameter than the shank of the bolt.

For the purpose of increasing the resistance to the turning of the bolt head 18, relatively to the member 12, in the clamping of said member and rod together by said bolt, a washer 19 of yieldable and compressible material is inserted between the said first mentioned parts. The shank of said bolt is inserted through said washer and the latter is adapted to be compressed between the bolt-head 18 and the member 12, when the bolt is tightened to effect the clamping together of the parts 10 and 12. During the compression of the washer 19, the latter is held from rotation by means to be hereinafter described, and the friction between the contacting smooth inner face of the rotating bolt-head 18 and the adjacent flat surface of the non-rotatable washer 19 is increased as the washer is compressed. In order to provide increased resistance to the turning of the bolt-head 18 relatively to the non-rotatable washer 19, said bolt-head is provided, in its inner smooth surface, with a plurality of concave recesses 20, 20, into which portions 19ª of the adjacent part of the washer are forced during the compression of the latter. Any backward rotation of the bolt-head will be resisted by such portions 19ª which project into said recesses 20, 20, and which portions 19ª must be depressed to permit any backward turning or loosening of the bolt.

The washer 19 is made from a material which, in addition to being yieldable and compressible, will not absorb grease or oil, and as a consequence, the surfaces of the head 18 and the washer, which are in frictional contact with each other, will be protected from the entrance between them of oil, grease or other lubricant that would tend to decrease the friction between said surfaces. The washer 19 is preferably made of cork, as it has been found that such material will not absorb oil or grease, and will prevent access of the same to the bearing surface of the bolt-head.

The washer 19, normally and prior to compression, (see Figs. 6 and 7,) has the same diameter as the bolt-head 18, and to confine the washer while under compression and prevent the same from being spread radially or laterally beyond its normal diameter during its compression, an annular member or ring 21 is applied around the washer, the interior surfaces of said ring being cylindrical and of substantially the same diameter as the bolt head. The washer 19, before being subjected to pressure, is preferably longer than the height of the ring 21, as shown in said Figs. 6 and 7, and said washer 19 fits closely within said ring. The base of said ring 21 is adapted to seat against an annular bearing surface or seat 22 formed on the outer face of the end portion 14 of the bearing member 12. Said seat 22 surrounds the bolt hole 15 and is concentric with the same. Said ring 21 is provided at the base thereof with an inwardly extending, annular flange 23 which is adapted to engage or bear against the seat 22. Said seat 22 is provided with a plurality of radial, circumferentially spaced, locking notches 24, as best shown in Fig. 2; said notches being shown as opening at their inner ends into the bolt hole 15. The base flange 23 of said ring 21 is provided with a plurality of inwardly extending, circumferentially spaced, integral, radial tongues or locking arms 25 adapted to enter said notches when the ring 21 is seated on the bearing member 12. The tongues or arms 25 are inclined outwardly from the base flange 23, and the notches 24 are deeper at their inner ends than at their outer ends to correspond with the inclination of said arms. The side walls of the notches 24 constitute shoulders against which the tongues or arms 25 are adapted to abut, and serve to prevent rotation of said ring in the turning of the bolt-head. The central opening between the inner ends of the tongues or arms 25 is large enough to permit the bolt 17 to be inserted therethrough.

As shown in Figs. 3 and 5, when the ring 21 is placed against the bearing surface 22, spaces or recesses are formed between the arms 25, and into such spaces or recesses portions 19ᵇ of the inner face of the washer 19 are forced during compression of the same. These portions 19ᵇ, which project into said spaces, have interlocking engagement with the sides of the locking arms 25, thereby preventing rotation of the washer within the ring during compression of the same by the turning of the bolt. The flange 23 and arms 25, extending inwardly from the base of the ring 21, give to said ring a cup-shaped form.

The clamping device, above described and shown in the drawings, is used in the following manner: The yieldable washer 19 is inserted in the ring 21 with its inner face in contact with the base flange 23. The clamping member or bolt 17 is then inserted through the washer and ring and into the holes 15, 16. A wrench or like tool is applied to the end portion 26 of the bolt and the latter rotated to effect the clamping of the parts 10 and 12. As the bolt-head 18 is drawn toward the opposing surface 22 of the member 12, the washer 19 and ring 21 are brought against said bearing seat 22, and the locking arms 25 of said ring 21 enter the locking notches 24. When such parts are interlocked, the ring 21 is held from rotation during the turning of the bolt-head. As the rotation of the bolt-head is continued, said bolt-head is drawn toward the member 12 and acts to force the yieldable washer 19 into the ring 21 and compress the said washer between the bolt head and the opposing surface 22 of the member 12. The ring 21 being held against rotation and surrounding the washer, said ring prevents radial spreading or expanding of the washer as the same is compressed, and the portions 19ᵇ of the inner surface of the washer are forced into the spaces between the arms or tongues 25, so as to hold the washer from rotation during its compression. As the washer is compressed parts of the same are forced into the recesses 20, 20 of the bolt-head. When the bolt has been tightened to a desired or necessary extent, backward turning or loosening thereof will be prevented by the interlocking of the ring 21 with the member 12, the interlocking of the washer with the arms on said ring, and the engagement of the projecting parts 19ᵃ with the recesses 20 of the bolt-head. In other words, the frictional resistance to the turning of the bolt-head on the washer is greatly increased by the portions 19ᵃ of the outer surface of the washer projecting into the said recesses 20, inasmuch as such portions 19ᵃ must be forcibly depressed in order to permit rotation of the bolt-head. Such depression of the said projecting parts 19ᵃ cannot be effected except by the application of such force in turning the bolt as will further compress the material of the washer in the space in which it is closely confined. Similarly, the projecting parts 19ᵇ on the inner surface of the washer will be held in interlocking relation to the arms 25 on the ring 21, by the pressure on the material of the washer while confined in such space. Moreover, the ring or annular member 21 acts to hold the washer under compression under the pressure applied thereto. The washer 19 being made of a material that will not absorb grease or oil, the contacting surfaces of the washer and bolt-head will not be subject to the action of lubricant, such as would decrease the friction between such parts. The bolt-head 18, having a diameter substantially equal to that of the internal diameter of the ring, acts to entirely inclose or confine the yielding material of the washer, so that the latter may be subjected to a high degree of pressure in the tightening of the bolt. Moreover, the washer is entirely surrounded and inclosed by the ring and other parts, so that it is entirely protected from mechanical injury.

The recesses 20, 20 in the inner bearing surface of the bolt-head 18 and the spaces formed between the locking arms 25 when the ring is seated against the bearing surface of the member 12 form irregular annular bearing surfaces against which the outer and inner surfaces of the washer 19 are held when the washer is under compression, and the interlocking of the outer and inner bearing surfaces of the washer with said irregular annular bearing surfaces acts to prevent rotation of the washer relatively to the member 12 in the turning of the bolt-head, and furthermore, the interlocking of the outer bearing surface of the washer with the said irregular bearing surface of the bolt-head acts to resist the backward turning of the bolt-head, as hereinbefore stated.

In the form of device shown in the drawings, the member 12 constitutes the non-rotatable member and the bolt-head 18 the rotatable member, the yielding washer 19 being interposed between said members.

The clamping device herein described and shown may be applied to prevent the backward turning of a nut as well as a bolt, and I do not wish to be limited to the specific features of construction herein described and shown in the drawings further than pointed out in the appended claims.

I claim as my invention:

1. The combination with a non-rotative member and a rotative member having screw-threaded engagement therewith, of a washer of yielding material interposed between said members, and a ring surrounding said washer and having interlocking connection with said non-rotative member, said rotative member having a part adapted to enter said ring, said part bearing on said washer and adapted to compress the same in said ring and against the opposed surface of said non-rotative member, when said rotative member is turned relatively to said ring and said non-rotative member.

2. The combination with a non-rotative member and a rotative member having screw-threaded engagement therewith, of a washer of yielding material interposed between said members, and a ring surrounding said washer and having interlocking connection with said non-rotative member, said rotative member having a part adapted to enter said ring, said part bearing on said washer and adapted to compress the same in said ring and against the opposed surface of said non-rotative member, when said rotative member is turned relatively to said ring and said non-rotative member, and the bearing surfaces of said part and said non-rotative member in contact with said washer having recesses in which portions of said washer are forced when the latter is placed under compression.

3. The combination with a non-rotative member and a rotative member having screw-threaded engagement therewith, of a cork washer interposed between said members, and a ring surrounding said washer and having interlocking connection with said non-rotative member, said rotative member having a part adapted to enter said ring, said part bearing on said washer and adapted to compress the same in said ring and against the opposed surface of said non-rotative member, when said rotative member is turned relatively to said ring and said non-rotative member.

4. The combination with a non-rotative member and a rotative member having screw-threaded connection therewith, of a washer of yielding material interposed between said members, and a ring surrounding said washer, said ring being provided with at least one radially projecting locking arm, said non-rotative member being provided in the surface against which said washer is forced with at least one locking notch adapted to receive said arm, to hold the ring from rotation when the rotative member is turned, and said rotative member having a part bearing against said washer, adapted to enter said ring and force the washer therein to and against said non-rotative member, when said rotative member is turned relatively to said ring and said non-rotative member.

5. The combination with a non-rotative member and a rotative member having screw-threaded connection therewith, of a washer of yielding material interposed between said members, and a ring surrounding said washer, said ring being provided with a plurality of inwardly projecting locking arms adapted to extend beneath said washer, said non-rotative member being provided in its surface against which said washer is forced with a plurality of locking notches adapted to receive said arms, to hold said ring from rotation when said rotative member is turned.

6. The combination with a non-rotative member and a rotative member having screw-threaded connection therewith, of a washer of yielding material interposed between said members, and a ring surrounding said washer, said ring being provided with a plurality of inwardly projecting arms adapted to extend beneath said washer, said non-rotative member being provided in the surface against which said washer is forced with a plurality of locking notches adapted to receive said arms, and the surface of said non-rotative member between said arms forming spaces, and the bearing surfaces of said rotative member in contact with said washer being provided with recesses; portions of said washer being forced into said spaces between said locking arms and into the recesses in said rotative member when said washer is placed under compression.

In testimony that I claim the foregoing as my invention I affix my signature in the presence of two witnesses, this 2nd day of May A. D. 1914.

AXEL LEVEDAHL.

Witnesses:
M. COKELY,
J. E. BARBER.